(12) United States Patent
Porte et al.

(10) Patent No.: US 6,479,124 B1
(45) Date of Patent: *Nov. 12, 2002

(54) COMPOSITE MATERIAL PANEL WITH SHOCK-PROTECTED EDGES

(75) Inventors: Alain Porte, Colomiers; Robert Andre, Lacroix-Falgarde, both of (FR)

(73) Assignee: Aerospatiale Societe Nationale Industrielle, Paris Cedex (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/341,960
(22) PCT Filed: Nov. 18, 1998
(86) PCT No.: PCT/FR98/02464
§ 371 (c)(1),
(2), (4) Date: Aug. 10, 1999
(87) PCT Pub. No.: WO99/26781
PCT Pub. Date: Jun. 3, 1999

(30) Foreign Application Priority Data

Nov. 21, 1997 (FR) .............................. 97 14868

(51) Int. Cl.[7] ................................ B32B 15/14
(52) U.S. Cl. .................. 428/68; 264/257; 264/258; 428/75; 428/76; 428/121; 428/192; 428/194

(58) Field of Search ................................ 42/68, 75, 76, 42/192, 194, 121; 264/257, 258

(56) References Cited

U.S. PATENT DOCUMENTS

| 4,608,453 A | | 8/1986 | Freeman ................ 174/35 MS |
| 5,041,323 A | * | 8/1991 | Rose ......................... 428/116 |
| 5,315,820 A | | 5/1994 | Arnold ...................... 428/116 |
| 5,422,165 A | * | 6/1995 | Arnold ...................... 428/192 |
| 5,486,096 A | | 1/1996 | Hertel et al. ................ 428/290 |

FOREIGN PATENT DOCUMENTS

| EP | 0 730 951 | 9/1996 |
| GB | 1 274 871 | 5/1972 |

* cited by examiner

*Primary Examiner*—Nasser Ahmad
(74) *Attorney, Agent, or Firm*—Young & Thompson

(57) ABSTRACT

A panel of composite material, in particular with a thermosetting or thermoplastic matrix, with edges and/or external surface protected from shocks and erosion, for any streamlining element for housings or nacelles of aeronautical motors, comprises, over all or a portion of its edges, a cladding which forms a border overlapping the two opposite surfaces of the panel. The border comprises a metallic cloth connected to the structure of the panel by an adhesive agent, diffused through the cloth. The panel is particularly applicable to aircraft.

21 Claims, 2 Drawing Sheets

COMPOSITE MATERIAL PANEL WITH SHOCK-PROTECTED EDGES

CROSS REFERENCE TO RELATED APPLICATION

This is the 35 USC 371 national stage of international application PCT/FR98/02464 filed on Nov. 18, 1998, which designated the United States of America.

FIELD OF THE INVENTION

The present invention relates to panels of composite material, in particular thermosetting or thermoplastic matrices, particularly for streamlined bodies, hatches, aircraft access doors and more particularly to panels with edges and/or external surfaces protected against shocks or erosion.

BACKGROUND OF THE INVENTION

Such panels are exposed by their external surface to various aggressions such as particularly erosion due to air, water, sand, etc . . . or to shocks due to handling or to contact with unexpected objects such as birds, or to other causes, which can harm the integrity of the composite material and particularly give rise to separation of the fibers, particularly of carbon, imperiling the reliability of the structure.

The invention aims precisely at protecting the exposed surface and/or edges of such panels.

In the past, it has already been sought to protect edges of structures of streamlined bodies particularly exposed either to erosion phenomena or to shocks, and to this end, various known techniques for protection have been or could be used.

One means could consist in providing a cemented on metallic corner, of stainless steel or aluminum for example, of U-shape or L-shape, on one of the section or sections of the panel to be protected.

This technique, in the case of a panel of composite material, is difficult to use, particularly on shaped pieces, because of the monolithic character of the corner and of their nature. A stainless steel corner has in effect a hard and smooth surface condition preventing any structural adhesion of the cement, so that a very complicated chemical treatment is necessary, whilst an aluminum corner has the very high risk of corrosion, in the case of composite structures using carbon fibers, because of the existence of a very substantial aluminum-carbon galvanic couple.

Another solution consists in riveting a corner of stainless steel of U-shape or L-shape on the edge of the panel, but it is complicated and costly to use and requires precautions to preserve the metallization.

According to another solution described in U.S. Pat. No. 5,486,096 seeking to protect a wing profile of composite material, the leading edge of the structure is covered with a cap forming a grill of stainless steel shaped in correspondence to the attack edge to be protected.

Moreover, in GB 1 274 871, EP 0 730 951 and U.S. Pat. No. 5,315,820, there are disclosed panels of composite structure covered on one of the surfaces with a protective cladding including a metallic cloth, but such protection does not extend to the edges nor to the rim nor to the opposite surface of these panels.

The edge of a panel of composite material can also be covered with anti-erosion paint, but this solution is fragile and has low durability with time and requires replacement of the protection in the course of the surface lifetime of the structure. Moreover, it insufficiently protects the edge in particular in case of shocks during handling of the panel, in the case of the panel of doors and hatches, during cycles of opening/closing.

Moreover, such paint is badly adapted to sharp angles and it is often found, after drying the paint, that the edge is uncovered.

Finally, the use of paint is sensitive and the drying time is too long, of the order of a week for total drying.

A strip of polyurethane can also be envisaged for covering the edges of panels, but this material has too high a sensitivity to aeronautical liquids.

The covering of such edges can finally be carried out by spraying a layer of lacquer, but this solution is fragile and is not adapted to pieces that have to be frequently handled, such as hatches over motors.

SUMMARY OF THE INVENTION

The present invention seeks to overcome the various drawbacks of such solutions by providing other means, adapted to ensure protection that will be effective, durable and easy to use.

To this end, the invention has for its object a panel of composite material, in particular a thermosetting or thermoplastic matrix, with edges and/or an external surface protected from shocks or erosion, for all elements of streamlined compartments or nacelles of aircraft motors, characterized in that it comprises, over all or a portion of its edges, a cladding which forms a border overlapping the two opposite surfaces of the panel, constituted by a metallic cloth connected to the structure of the panel by means of an adhesive agent to fuse through said cloth.

According to one embodiment, said cladding covers all the external surface of the panel, as well as the edge and is prolonged along the edge of an internal surface of the panel.

In the structure according to the invention, the adherence of the metallic cloth to the panel structure, constituted by mineral fibers, particularly carbon plies, embedded in a matrix of suitable resin, is imparted by the resin impregnating the fibers or by a suitable adhesive or cement, the adhesive agent being diffused through the cloth.

The metallic cloth is for example constituted by a single layer structure of woven monofilaments of stainless steel.

Such panels are remarkable in that they have perfect integration of the protection to the structure of the panels thanks to the homogeneous connection between the protective metallic cloth and the composite material, provided by the intimate diffusion through the woven structure of the adhesive agent, namely the resin impregnating the fibers of the composite and/or the adhesive or cement that may be used.

The cementing of the protection is hence excellent and the nature of the protection, a metallic cloth perfectly applied against the composite, ensures excellent resistance to erosion and to chocks.

BRIEF DESCRIPTION OF THE DRAWINGS

The invention also has for its object various methods of production of such panels, which will now be described in detail with reference to the accompanying drawings, in which.

DETAILED DESCRIPTION OF THE INVENTION

Figure 1:
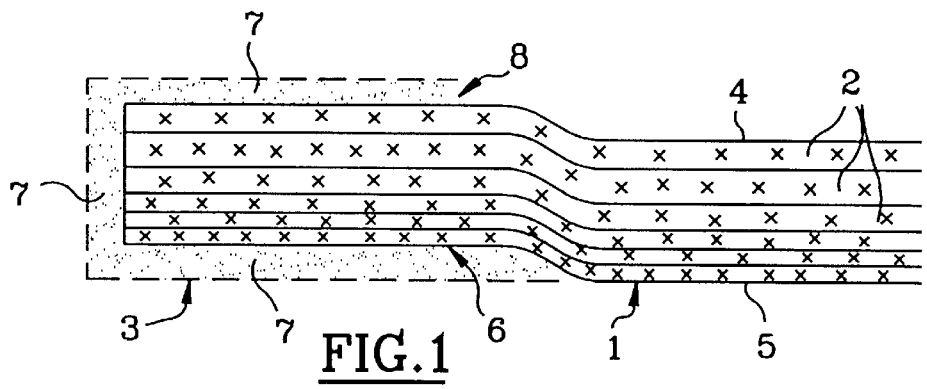
FIG. 1 is a schematic fragmentary cross sectional view of a panel of composite material provided with an edge according to the invention.

In FIG. 1, there is shown at 1 a surface of a composite material of a panel constituting a streamlined element of the housing or nacelle of aircraft motors, such as a fan hatch for example.

The structure 1 comprises a certain number of plies 2 of carbon which are superposed, each constituted for example by a cloth of pre-impregnated carbon fibers.

According to the invention, the structure 1 is protected along the edge by a cladding constituted by a metallic cloth 3 covering both the section of the edge of the structure and a portion of the two opposite surfaces, the internal surface 4 and the external surface 5, of the panel.

The external surface 5 is that which is exposed to aggressions (erosion, shocks, etc . . . ) from which the panel must be protected.

To this end, so that the protective cloth 3 will be flush with the exposed surface of the unprotected surface portion, there is provided during production, opposite to the border region to be protected, an offset (6) of the plies 2 corresponding to the thickness of the cloth 3 and of the eventual adhesive or cement used, as shown at 7 in FIG 1.

On the internal surface 4 of the panel, there is to be found, facing the offset 6, a corresponding protrusion 8.

The protective cloth 3 covers precisely the portions 6 and 8.

The cloth 3 is for example a woven single layer of monofilaments of stainless steel or titanium.

The characteristics of weaving, particularly the diameter of the filaments, the spacing between filaments, the material of the filaments, are determined as a function of the nature of the panel and of the resistance to erosion and to shocks that is desired.

The adhesive or cement 7, when it is provided, is suitable for the nature of the cloth 3 and that of the composite material. It ensures by itself, and if desired conjointly with the impregnation resin of the fibers of the plies 2, the adherence of the cloth 3 to the structure 1. The porous structure of the cloth 3 contributes to good diffusion of the adhesive agent intimately and homogeneously through the cloth 3, thereby ensuring perfect integration of the protection to the panel.

Figure 2:
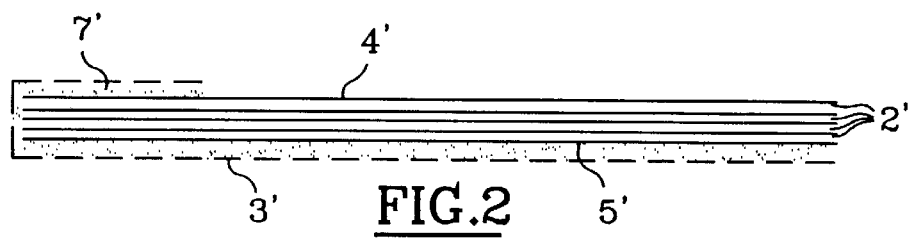
FIG. 2 is a schematic fragmentary cross sectional view of a panel of composite material whose external surface and the edge are protected according to the invention.

FIG. 2 shows a panel also formed of carbon plies 2', clad on its external surface 5' with a metallic cloth 3', analogous to that of FIG. 1, also covering the edge of the panel and folded back against a portion of the internal surface 4'.

It is not necessary in this case to provide at the edge of the panel an offset on the external surface 5' because the whole of this surface is covered by the cloth 3'.

As in the case of the panel of FIG. 1, the adhesion between the cloth 3' and the composite structure 2' is ensured, either by the resin impregnating the carbon fibers, or by an adhesive or cement 7', alone or in association with said resin, the adhesive being added.

The fibers of the composite material can of course be of any nature usually used for producing panels of the type contemplated by the present invention.

Various production techniques could be, according to the invention, used for producing the above panels.

There will now be described a method, called co-baking, applied to a panel according to FIG. 1 and shown in FIG. 3.

In a flat bottom mold 9, there are draped a certain number of plies 2 of pre-impregnated carbon fibers, the surface of the stack turned toward the bottom of the mold corresponding to the external surface of the panel.

At the same time, there is placed about the edge a metallic cloth 3.

The mold 9 is then covered with a protective film 10 sealed about the periphery of the mold.

The assembly is placed in an autoclave and subjected to predetermined temperatures and pressures, for a predetermined time, so as in known manner to harden or bake the impregnation resin.

There is thus carried out the direct integration of the cloth 3 with the composite material by providing in a single operation a matrix binding both the fibers of the plies 2 and the metallic cloth 3.

Instead of a film 10 and external pressure, there can also of course be used a bladder connected to a source of vacuum, the assembly being placed in an oven.

If an adhesive or cement such as 7 is placed between the cloth 3 and the plies 2, the connection between the cloth and the composite material will be ensured, as indicated above, by said adhesive, if desired associated with the impregnation resin.

This adhesive can be used in the course of a second phase, the first consisting in placing in the mold 9 the plies 2 with chock at the position of the future edge and to carry out a first baking. The molded panel can thus be withdrawn from the mold and precisely processed. It is then replaced in the mold at the same time as the metallic cloth 3 and with interposition of the adhesive 7.

There is then carried out in a known manner the cementing between the cloth 3 and the panel.

This procedure has the advantage of better dimensional precision of the panel than in the case of co-baking in which problems of the edges can arise after polymerization (the edges having bled) and in which it is often difficult to polymerize precisely because of the mass of resin and malformation of the corners.

It is to be noted that the metallic cloth 3 has a good flexibility, permitting it to mate ideally with the curved or angled surfaces.

Figure 3:
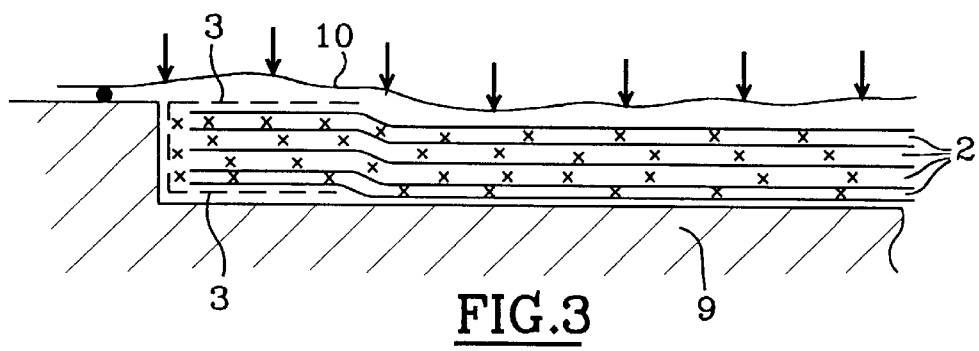
FIG. 3 is a schematic fragmentary cross sectional view of a panel of the type of FIG. 1, being produced by the co-baking.
Figure 4:
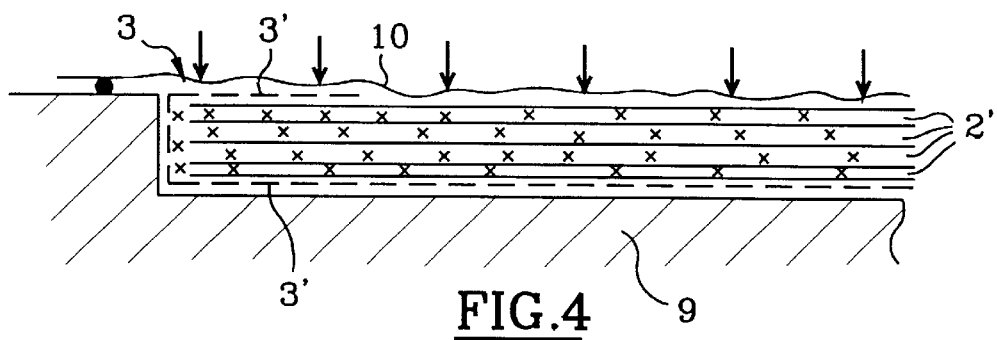
FIG. 4 is a schematic fragmentary cross sectional view of a panel of the type of FIG. 2, being produced by the co-baking.

FIG. 4 shows the production of a panel of the type of FIG. 2 according to the same technique as in FIG. 3. The operative steps indicated above with respect to FIG. 3 are equally applicable to the case of FIG. 4.

Figure 5A:
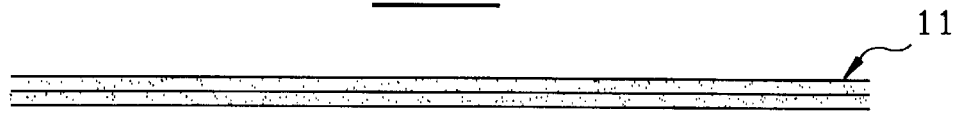
FIGS. 5a and 5b show two phases of production according to the technique of mixed baking of a panel with protection on its edge and on its external surface.
Figure 5B:
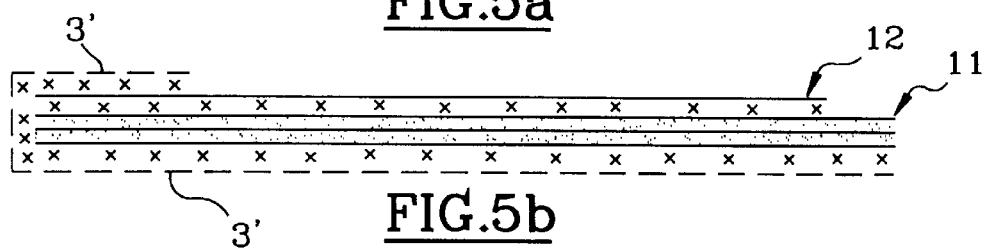

FIGS. 5a and 5b show a method of production of a panel using mixed baking and more precisely a multiphase baking, also called multibaking.

It consists in first producing the external surface of a panel (FIG. 5a) from one or several layers for example of carbon 11 polymerized by a first baking, then to integrate a metallic cloth 3' by co-baking with other carbon plies 12 (FIG. 5b) in the course of a second baking.

Cementing the cloth 3' which covers all the external surface, is carried out in the course of the second baking, thanks to the resin impregnating the fibers of the plies 11 and 12 and/or the adhesive or the cement, such as 7 or 7' applied to desired places.

This technique is also applicable in the case of the protection only of the edges.

Figure 7:
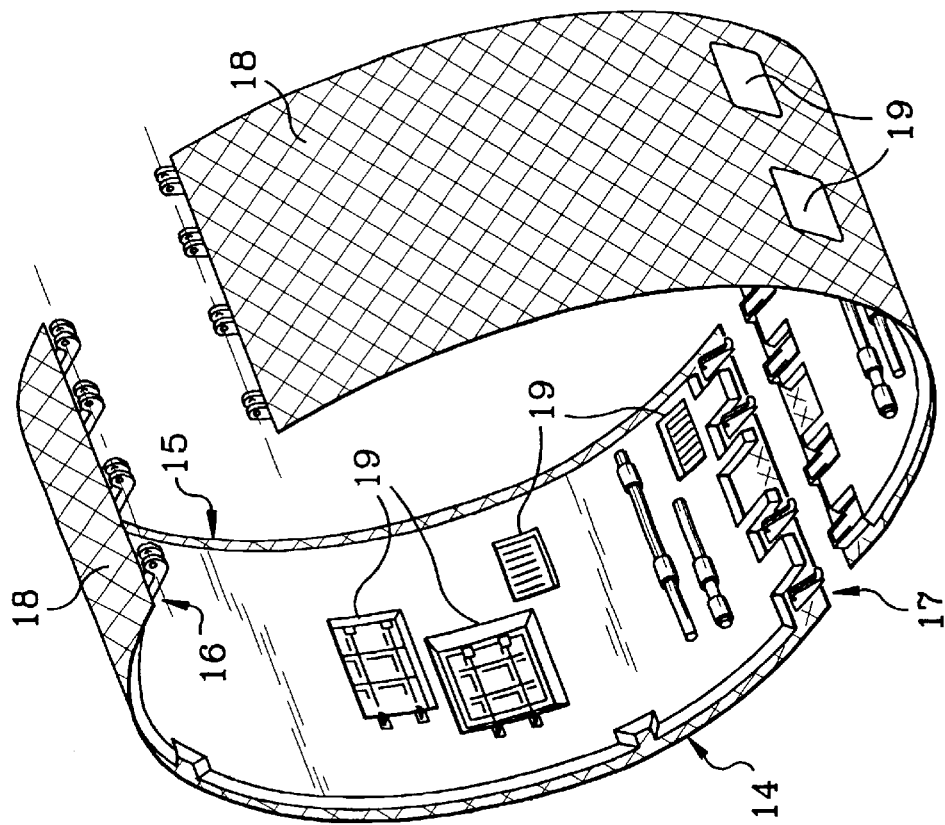
FIG. 7 is a view similar to FIG. 6 of hatches protected both at the edge and on the external surface.
Figure 6:
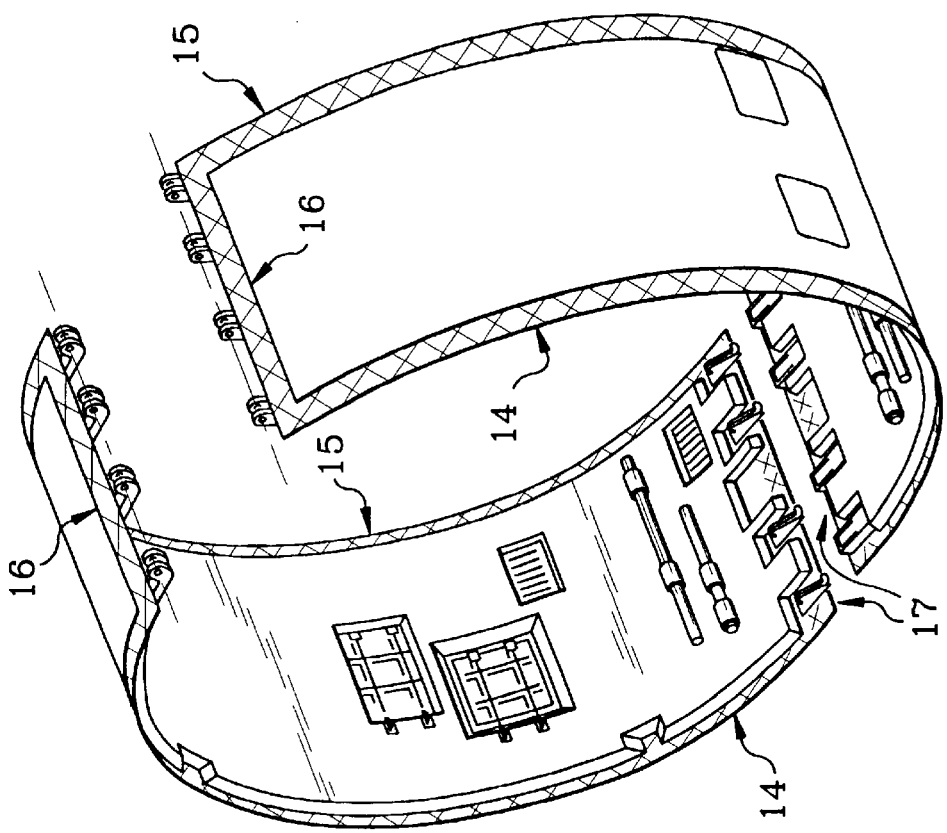
FIG. 6 is a side view of the hatches of a fan of a turboreaction engine with edges protected according to the invention.

FIGS. 6 and 7 show an embodiment of fan hatches using panels protected according to the invention, respectively on the edges (FIG. 6) and on both the edges and the external surface.

All the edges are involved, namely, the front edges 14, rear edges 15, upper edges 16 and lower edges 17.

The outer surfaces 18 (FIG. 7) cover all the panels except various positions 19 for access doors, ventilation grills, etc . . .

The solution thus provided by the invention for the protection of panels of composite material exposed to aerodynamic friction and/or shocks, ensures a perfect integration of the protection to the panels.

The properties of flexibility of the woven protective structure (3, 3'), before impregnation with the binding agent, permit it to shape perfectly to the aerodynamic surfaces of the panel (without pleats).

The porous character of the woven structure permits intimate impregnation of the binding agent and hence perfect cementing.

The panels thus produced have excellent surface qualities not only as to durability with time but also as to resistance to shocks and erosion or again the surface condition.

The technique of the invention is moreover easy to use, the woven metallic structure being easily draped in particular for the production of composite panels.

It is also to be noted that the use of a metallic protective structure gives the panel a perfect protection against lightening and offers a continuity of metallization between the edges and their abutments, of a metallic nature.

The protection offered by the invention can also be applied to existing panels or used to repair such panels.

Finally, it should be noted that the woven metallic structure 3, 3', both in the case of an edge (FIG. 1) and in the protection of the entire external surface (FIG. 2), need have no fold over on the internal surface of the panel, the protection on the periphery of the panel extending only over the edge.

Of course, the invention is not limited to the embodiments shown and described above, but covers on the contrary all modifications, both as to the protection itself (nature of the woven structure, physical characteristics, nature of the adhesive agent or composite material of the panel), as well as the nature of said composite material (pre-impregnated fibers woven or non-woven, wound fibers, the nature of the fiber and of the impregnation resin, thermosetting or thermoplastic).

In this way, according to a modified embodiment of a panel according to the invention whose composite support of the protective cladding is constituted by a thermoplastic sheet, there is first formed the thermoplastic sheet, which is then exactly shaped to the desired size. Then said protective cloth cladding is applied to the desired positions (external surface and/or edges), with interposition if desired of a suitable adhesive or cement, and finally, there is carried out the cementing by baking of said metallic cloth with said finished panel.

What is claimed is:

1. A panel of composite material, with external surface protected from shocks or erosion, for use as an element for streamlining housings or nacelles of aircraft motors, the panel comprising over all or a portion of its edges, a cladding which forms a border overlapping two opposite surfaces of the panel, said cladding comprising a metallic cloth connected to the panel by an adhesive agent diffused through said cloth, the border regions protected by said cladding being provided with an offset corresponding to the thickness of said cladding so that said cladding is flush with the exposed surface of said external surface.

2. The panel according to claim 1, wherein said metallic cloth is constituted by a single layer structure of woven monofilaments of stainless steel or titanium.

3. The panel according to claim 1, wherein the composite material comprises fibers, and the adhesive agent is constituted by a resin impregnating the fibers of said composite material.

4. The panel according to claim 1, wherein said adhesive agent is constituted by an adhesive or cement.

5. The panel according to claim 1, wherein the composite material is a thermoplastic sheet.

6. The process for the production of a panel according to claim 1, which comprises placing in a mold an assembly of at least one ply of a cloth with pre-impregnated fibers, and a cladding of metallic cloth about at least a portion of the edges of said at least one ply; and bonding the assembly by co-baking.

7. The process according to claim 6, further comprising interposing an adhesive or cement between said at least one ply of cloth of fibers and the metallic cloth before co-baking.

8. The process according to claim 7, further providing in front of a border region to be protected an offset of said plies corresponding to the thickness of the metallic cloth and of the adhesive or cement.

9. The process for the production of a panel according to claim 1, which comprises:

placing in a mold at least one ply of cloth with pre-impregnated fibers;

carrying out a first baking to obtain a molded panel;

then shaping the molded panel to the desired size;

replacing in said mold said panel, as well as a cladding of metallic cloth at the desired positions, with interposition of an adhesive of cement; and finally cementing said metallic cloth to the panel by a second baking.

10. The process for the production of a panel according to claim 1, which comprises:

forming in the course of a first baking the external surface of the panel;

then carrying out in the course of a second baking the cementing of a cladding of metallic cloth positioned at the desired locations, conjointly with the addition to said external surface of a layer of the same nature constituting the internal surface of the panel.

11. The process for the production of a panel according to claim 5, which comprises:

forming a thermoplastic sheet;

then finishing the desired size;

placing said cladding of metallic cloth at the desired positions, with optional interposition of an adhesive or cement; and finally cementing said metallic cloth to said finished panel by baking.

12. A panel of composite material, said panel having an internal surface, an edge and an external surface protected from shocks or erosion, said panel intended to be used as an element for streamlining housings or nacelles of aircraft motors, the panel comprising on said external surface a metallic cloth connected to the panel by an adhesive agent diffused through said metallic cloth, and said metallic cloth covering all the external surface of the panel as well as the edge and extending over the internal surface of the panel.

13. The panel according to claim 12, wherein said metallic cloth is constituted by a single layer structure of woven monofilaments of stainless steel or titanium.

14. The panel according to claim 12, wherein the composite material comprises fibers, and the adhesive agent is constituted by a resin impregnating the fibers of said composite material.

15. The panel according to claim 12, wherein said adhesive agent is constituted by an adhesive or cement.

16. The panel according to claim 12, wherein the composite material is a thermoplastic sheet.

17. The process for the production of a panel according to claim 12, which comprises:

placing in a mold an assembly of at least one ply of a cloth with pre-impregnated fibers, and said metallic cloth on said at least one ply;

covering the edge of said at least one ply with said metallic cloth and folding said metallic cloth back against a portion of the internal surface of said at least one ply; and bonding the assembly by co-baking.

18. The process according to claim 17, further comprising interposing an adhesive or cement between said at least one ply of cloth of fibers and the metallic cloth before co-baking.

19. The process for the production of a panel according to claim 12, which comprises:

placing in a mold at least one ply of cloth with pre-impregnated fibers;

carrying out a first baking to obtain a molded panel;

then shaping the molded panel to the desired size;

placing in said mold successively said metallic cloth, then said molded panel, with interposition of an adhesive or a cement;

covering the edge of said molded panel with said metallic cloth and folding said metallic cloth back against a portion of said molded panel with interposition of an adhesive or a cement; and finally cementing said metallic cloth to the panel by a second baking.

20. The process for the production of a panel according to claim 12, which comprises:

forming in the course of a first baking the external surface of the panel;

then carrying out in the course of a second baking the cementing of a metallic cloth, conjointly with the addition to said external surface of a layer of the same nature constituting the internal surface of the panel.

21. The process for the production of a panel according to claim 16, which comprises:

forming a thermoplastic sheet;

then, shaping it at the desired size;

placing said metallic cloth over the external surface, the edge and a part of the internal surface of said thermoplastic sheet, with optional interposition of an adhesive or cement; and finally cementing said metallic cloth to said finished panel by baking.

* * * * *